United States Patent [19]

Lambden

[11] 4,129,746
[45] Dec. 12, 1978

[54] ELECTROGRAPHIC APPARATUS AND HAND REST FOR USE THEREWITH

[75] Inventor: Martin R. Lambden, Wimborne, England

[73] Assignee: Quest Automation Limited, Dorset, England

[21] Appl. No.: 792,829

[22] Filed: May 2, 1977

Related U.S. Application Data

[62] Division of Ser. No. 710,083, Jul. 30, 1976, Pat. No. 4,070,544.

[30] Foreign Application Priority Data

Aug. 5, 1975 [GB] United Kingdom ............... 32687/75

[51] Int. Cl.² .............................................. G08C 21/00
[52] U.S. Cl. ..................................... 178/18; 248/118.1
[58] Field of Search ............................. 178/18, 19, 20; 248/118.1; 197/101; 35/37

[56] References Cited

U.S. PATENT DOCUMENTS

| 607,675 | 7/1898 | Barr | 248/118.1 |
| 1,869,910 | 8/1932 | Omegna | 248/118.1 |
| 3,480,728 | 11/1969 | Chandler | 178/18 |
| 3,885,097 | 5/1975 | Pobgee | 178/18 |

*Primary Examiner*—Thomas A. Robinson
*Attorney, Agent, or Firm*—Pollock, VandeSande and Priddy

[57] ABSTRACT

Electrographic apparatus, that is apparatus for obtaining electrical signals related to the movement of a point, such as a pen or stylus, over a pressure sensitive surface. The apparatus comprises a hand-supporting plate movable relative to the pressure sensitive surface to provide a convenient hand-rest during writing or drawing without the hand touching the pressure sensitive surface.

4 Claims, 4 Drawing Figures

ELECTROGRAPHIC APPARATUS AND HAND REST FOR USE THEREWITH

This is a division of application Ser. No. 710,083, filed July 30, 1976, now U.S. Pat. No. 4,070,544, issued Jan. 24, 1978.

BACKGROUND OF THE INVENTION

This invention relates to electrographic apparatus, that is apparatus for producing electrical signals representing data as to the position of a point on a surface. In one application, the invention is concerned with obtaining data related to the movement of a point, such as a pen or stylus, over a sheet which data can be coded for computer processing for eventual reproduction or can be used for transmission to a distance for facsimile reproduction. By this means, handwritten documents or drawings can be reproduced by computer processing or by simultaneous reproduction.

DESCRIPTION OF THE PRIOR ART

In known electrographic apparatus, a flexible membrane is mounted parallel to the surface of a fixed backing member, the opposing surfaces of the membrane and backing member being each provided with a conductive coating to form respective electrode surfaces. One such device is described in Pobgee British patent specification No. 1,310,683 (NRDC), corresponding to U.S. Pat. No. 3,885,097, issued May 20, 1975.

Two parallel edges of the fixed coating each have connection strips and two parallel edges of the coating on the flexible membrane also have connection strips at right angles to the strips on the fixed coating.

In use, a document to be recorded is placed on the flexible surface and a stylus, typically a ball-point pen, is used to write on the document. This causes the flexible membrane to be depressed locally under the stylus so that contact is made between the electrode surfaces. By electrically energizing the two surfaces in a suitable manner, it is possible to obtain two analogue electrical voltages representing the coordinates of the position of the stylus.

A difficulty with the known devices is that, in use, the hand tends normally to rest on the part of a document being written, producing unwanted contact over a wide area in addition to the desired local contact under the stylus. Such a difficulty has been pointed out, for example, by Pobgee in U.S. Pat. No. 3,885,097 which relates to a similar electrographic tablet. In that specification, however, Pobgee proposes to overcome the difficulty by making the surface itself discriminate between the relatively low pressure over a wide area produced by the hand of the operator and the high pressure over a small area produced by the point of a writing implement (see col. 3, lines 24 through 34).

The accuracy with which the electrical output signals represent the coordinates of the location at which the stylus is applied is limited by the uniformity of the surface resistivity of the electrode surfaces, and a high degree of uniformity becomes progressively more difficult to achieve with increasing surface area. These factors impose limitations on the size and usefulness of the device.

SUMMARY OF THE INVENTION

It is an object of the present invention to provide electrographic apparatus in which the above-described disadvantages of known devices are eliminated or substantially reduced.

The invention provides electrographic apparatus comprising:

(a) a pressure sensitive surface which, in use of the apparatus, responds to pressure applied by a writing instrument to provide electrical output signals related to the location of the instrument;

(b) a hand-supporting member upon which the hand may conveniently be rested during writing on said pressure sensitive surface, and (c) means supporting said pressure sensitive surface and said hand-supporting member and arranged to permit relative movement between the said surface and member during writing on said surface whereby, in use, the writing instrument can be moved conveniently to any required position on said surface.

DESCRIPTION OF THE ILLUSTRATED EMBODIMENTS

In order that the invention may be clearly understood and readily carried into effect, electrographic apparatus embodying the invention will now be described, by way of example, with reference to the accompanying drawings, in which.

Figure 1:
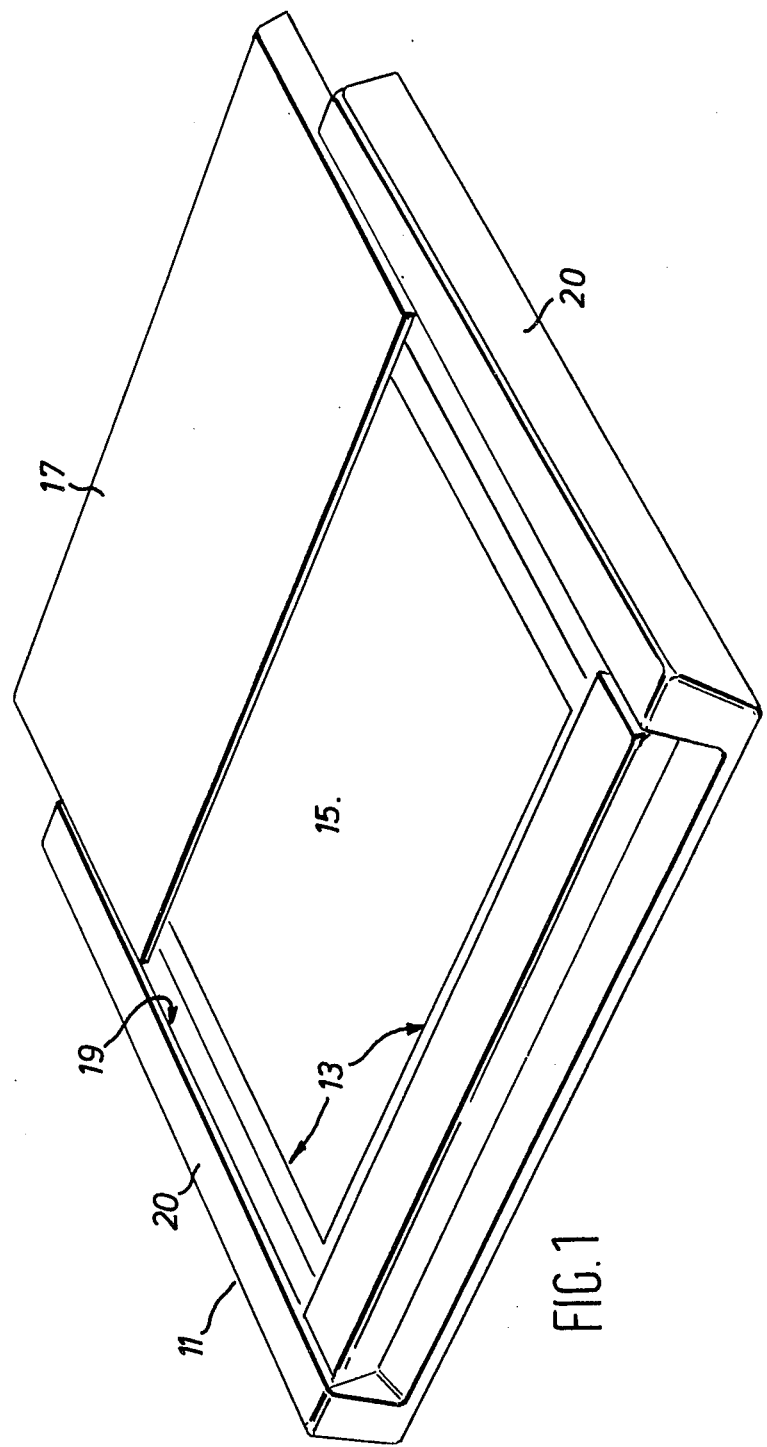
FIG. 1 is a general perspective view of a writing unit for a data input terminal in accordance with the invention.

The writing unit illustrated in FIG. 1 comprises a rectangular housing 11 provided in its upper wall with a window 13 exposing the upper surface of a taut flexible membrane 15 of a writing pad device housed within the unit. In use, a format sheet such as for example an order form, invoice or indeed any sheet of writing material for receiving hand-written symbols, writing or drawings is placed upon the flexible membrane 15. As will appear hereinafter, the membrane 15 is pressure sensitive so that the pen pressure acting on the membrane when writing on the format sheet with a relatively sharp writing instrument such as a ball-point pen enables the location of the pen to be substantially continuously sensed. Electrical signals are produced representing successively sensed locations, so that the successive signals represent the movements of the pen, and therefore the symbols or drawings produced thereby on the sheet of writing material. These signals can, for example, be used to reproduce the written symbols at a distance with suitable plotting equipment such as an oscilloscope, or can be further processed for character recognition and other analysis purposes.

Clearly, since the membrane 15 is pressure sensitive, it is undesirable for the surface of the membrane to be subject in use to any pressure other than that applied by the writing implement. In particular, pressure from the hand when writing on the sheet of writing material could interfere with satisfactory operation of the equipment. To provide a convenient hand-rest without touching the membrane, a hand-rest plate 17 is freely slideable across window 13 in grooves 19 (only one shown in the drawing) formed in respective side members 20 of the housing 11 above but parallel with the plane of the membrane. The plate 17 can, for example, be supported by means of roller bearings (not shown, but analogous to the rollers 50 in FIG. 4). In use, the hand can conveniently be rested on the plate 17 while writing, and the plate is free to follow the movement of the hand down the sheet without inconvenience to the writer.

Figure 2:
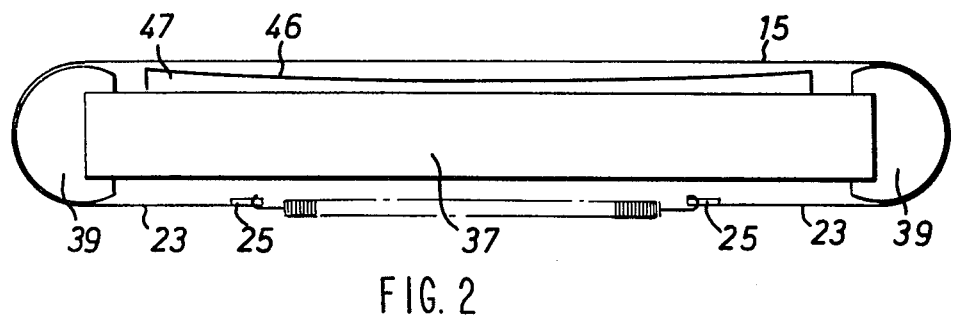
FIGS. 2 and 3 are respectively a schematic sectional side and an underside view of the pad device of FIG. 1.
Figure 3:
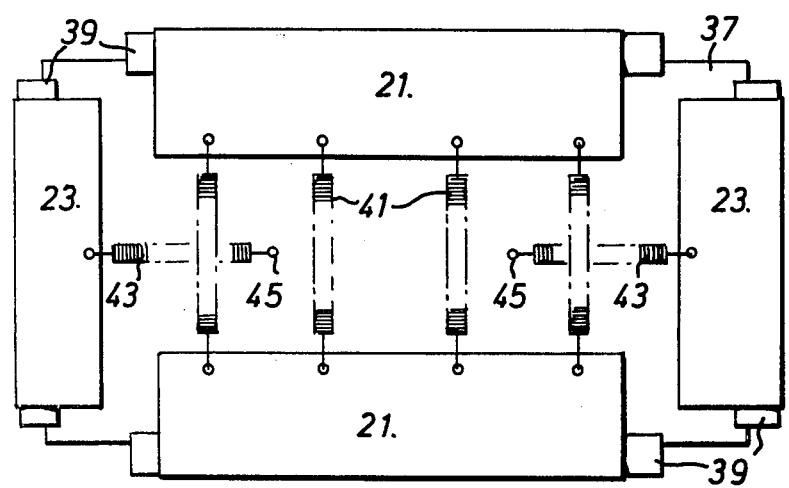

The construction of the writing pad device used in the unit of FIG. 1 is illustrated schematically in FIGS. 2 and 3. The device comprises the membrane 15 supported in a plane adjacent to but spaced from the upper surface 46 of a backing member 47 of electrically insulating material, the conductive film on the membrane being on the underside so as to face the surface 46. The upper surface 46 of member 47 is also provided with an electrically conductive film forming a second electrode surface and comprising a high resistivity portion in an area corresponding to the working area of the membrane and low surface resistivity portions forming end connections for the high resistivity portion. These portions can be screen printed carbon and metallized films respectively. Means are provided (not shown) for connecting external leads to the end connections.

Thus, if a format sheet placed upon the membrane 15 is written upon with a ball-point pen, the force applied by the pen tip presses the membrane into contact with the member 47 to make electrical connection between the two films, and the coordinates of the point of contact are represented by electrical signals derived from the alternately sensed potentials of the respective films.

To achieve satisfactory results from the apparatus, the force required to be applied at a point on the surface of the membrane to cause the membrane to contact member 47 should be substantially the same for all points in the working area of the membrane. To this end, the upper surface 46 of the member 47 is concave. It has been found that optimum results can be achieved with a radius of concavity such that, for a working area of approximately 5 × 7.5 inches the separation between the sheet and concave surface should be approximately 0.060 inch at the centre of the area reducing to approximately 0.030 inch at the edges of the area.

Further benefits as regards uniformity of the required membrane deflection force can be derived by mounting and tensioning the membrane in a suitable manner. In the illustrated embodiment, the membrane is substantially uniformly tensioned by stressed springs acting on the edges of the membrane, and is mounted in such a way as to be free to move against the action of the springs when a deflecting force is applied to the upper surface. As shown in FIGS. 2 and 3, side and end extensions 21 and 23 of membrane 15 are passed around part-cylindrical edge members 39 attached to the edges of base member 37, and stiffening bars 25 at the extremities of the extensions are connected to tensioned helical springs 41 and 43. The springs 43 are anchored to posts projecting from the underside of member 37 while springs 41 interconnect opposite side extensions 21. Of course many other convenient arrangements of springs would be equally satisfactory, provided a substantially uniform tension is applied to the membrane. The surfaces of the members 39 in contact with the membrane should be substantially frictionless, and may for example be coated with P.T.F.E. or have P.T.F.E. tape applied to them. Alternatively, the members 39 may be replaced by rollers to provide a substantially frictionless support for the membrane.

It will be appreciated that the illustrations in FIGS. 2 and 3 are purely schematic, and a practical embodiment would have many features which are not relevant to the present invention and have therefore been omitted from the drawings for the sake of clarity. In particular the member 37 would be provided with means for mounting the device in the housing 11 illustrated in FIG. 1.

Many modifications of the illustrated apparatus are possible without detracting from the advantages discussed above. For example, the tensioning springs or other tensioning means for the membrane could be arranged to act directly outwardly on the edges of the membrane, the whole of the membrane and the springs then lying in the plane of the working area of the membrane thereby dispensing with the necessity for a frictionless bearing such as presently provided by members 39. Such an arrangement would have the added advantage that the terminal unit itself could be reduced in height providing possible ergonomic advantages for the user.

Figure 4:
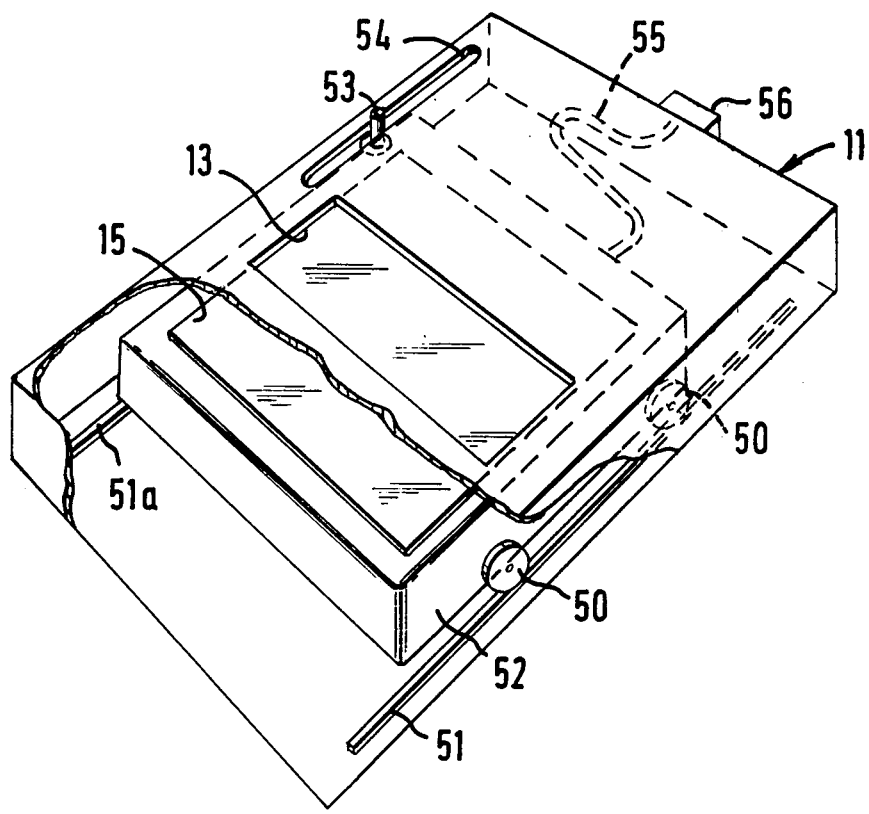
FIG. 4 is a general perspective view of an alternative embodiment of the invention.

In another possible modification, the hand-support plate 17 could be arranged to form part of an outer casing within which the writing pad device can slide towards and away from the plate 17. Such an arrangement is illustrated in FIG. 4. Within the housing 11, an electrographic pad 52 of the type described above is mounted on rollers 50 running on rails 51, 51a. The sensitive surface or membrane 15 of the pad is exposed through a window 13 which is much smaller than the surface 15, thus leaving an area of the top surface of the housing 11 to serve as a hand rest to facilitate writing on the part of the membrane 15 exposed through the window. The pad device 52 can be moved up and down on the rails 51, 51a by means of the stud 53 which protrudes through the slot 54 in the top of the housing so as to expose fresh areas of the membrane 15 as required. Electrical connection between the pad device 52 and the external circuitry is provided by the flexible lead 55 and connecting socket 56. In yet another possible modification, the plate 17 and membrane 15 are maintained in fixed positions but the writing material is moved in relation to these, for example by moving the writing material on a line-by-line basis.

I claim:
1. Electrographic apparatus comprising:
   (a) a pressure sensitive surface which, in use of the apparatus, responds to pressure applied by a writing instrument to provide electrical output signals related to the location of the instrument;
   (b) a hand-supporting member upon which the hand may conveniently be rested during writing on said pressure sensitive surface;
   (c) a housing having a window formed in a wall thereof, said pressure sensitive surface being mounted within said housing so as to be exposed through said window, and
   (d) bearing means on said housing, said bearing means supporting said hand-supporting member on said housing and arranged to permit movement of the said member across said window.

2. Apparatus as claimed in claim 1 wherein said bearing means comprises grooves formed in said housing to either side of said window and substantially parallel with the plane of said pressure sensitive surface, and said hand-supporting member comprises a plate extending between and slideable in said grooves.

3. Apparatus as claimed in claim 2 wherein said bearing means comprises roller bearings supporting said plate in said grooves.

4. Electrographic apparatus comprising:

(a) a pressure sensitive surface which, in use of the apparatus, responds to pressure applied by a writing instrument to provide electrical output signals related to the location of the instrument;
(b) a hand-supporting member upon which the hand may conveniently be rested during writing on said pressure-sensitive surface, and
(c) means comprising a housing supporting said pressure-sensitive surface and said hand-supporting member and arranged to permit relative movement between the said surface and member during writing on said surface, said pressure-sensitive surface being movably mounted in said housing and being exposed by a window formed in a wall of said housing, and said hand-supporting member being attached to said housing adjacent said window, whereby in use said pressure-sensitive surface can be moved toward and away from said hand-supporting member to permit the writing instrument to be located conveniently adjacent any required position on said surface.

* * * * *